(12) United States Patent
Liu

(10) Patent No.: US 7,280,712 B2
(45) Date of Patent: Oct. 9, 2007

(54) METHOD AND APPARATUS FOR PHASE SHIFTING AN OPTICAL BEAM IN AN OPTICAL DEVICE

(75) Inventor: Ansheng Liu, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 93 days.

(21) Appl. No.: 11/197,601

(22) Filed: Aug. 4, 2005

(65) Prior Publication Data

US 2007/0031080 A1    Feb. 8, 2007

(51) Int. Cl.
*G02F 1/035* (2006.01)
(52) U.S. Cl. .................................. 385/3; 385/1; 385/2
(58) Field of Classification Search ................. 385/1–3
See application file for complete search history.

(56) References Cited

U.S. PATENT DOCUMENTS

| | | |
|---|---|---|
| 3,852,119 A | 12/1974 | Gosney et al. |
| 4,019,197 A | 4/1977 | Lohstroh et al. |
| 4,093,345 A | 6/1978 | Logan et al. |
| 4,923,264 A | 5/1990 | Langer et al. |
| 5,007,062 A | 4/1991 | Chesnoy |
| 5,023,686 A | 6/1991 | Helmut et al. |
| 5,027,253 A | 6/1991 | Lauffer et al. |
| 5,166,946 A | 11/1992 | Caldwell |
| 5,260,960 A | 11/1993 | Amann et al. |
| 5,388,106 A | 2/1995 | Tabuchi |
| 5,422,904 A | 6/1995 | Gorfinkel et al. |
| 5,434,700 A | 7/1995 | Yoo |
| 5,461,684 A | 10/1995 | Vinchant et al. |

(Continued)

FOREIGN PATENT DOCUMENTS

EP    1 256 825 A2    11/2002

(Continued)

OTHER PUBLICATIONS

Nowak, E.D. et al., "Speed, Power, and Yield Comparison of Thin Bonded SOI versus Bulk CMOS Technologies," Proceedings 1994 IEEE International SOI Conference, (Oct. 1994), pp. 41-42.

(Continued)

*Primary Examiner*—Jennifer Doan
(74) *Attorney, Agent, or Firm*—Blakely, Sokoloff, Taylor & Zafman LLP

(57) ABSTRACT

An apparatus and method for high speed phase modulation of optical beam. For one embodiment, an apparatus includes an optical waveguide having adjoining first and second regions disposed in semiconductor material. The first and second regions have opposite doping types. A first buffer is disposed along the optical waveguide. A first higher doped region of semiconductor material is also included outside an optical path of the optical waveguide. An inner portion of the first higher doped region is adjoining and coupled to the first region of the optical waveguide. An outer portion of the first higher doped region is adjoining the first buffer. The first higher doped region has a higher doping concentration than a doping concentration within the optical path of the optical waveguide. A first contact having an inner portion adjoining and coupled to the first higher doped region is also included. The first contact has an outer portion adjoining the first buffer.

19 Claims, 6 Drawing Sheets

U.S. PATENT DOCUMENTS

| | | | |
|---|---|---|---|
| 5,541,950 A | 7/1996 | Kizuki et al. | |
| 5,568,502 A | 10/1996 | Hironaka | |
| 5,610,095 A | 3/1997 | Zirngibl | |
| 5,661,825 A | 8/1997 | Van Dam et al. | |
| 5,684,819 A | 11/1997 | Zirngibl | |
| 5,726,462 A | 3/1998 | Spahn et al. | |
| 5,748,358 A | 5/1998 | Sugamata et al. | |
| 5,838,844 A | 11/1998 | Van Dam et al. | |
| 5,933,554 A | 8/1999 | Leuthold et al. | |
| 5,978,402 A | 11/1999 | Matsumoto et al. | |
| 5,994,729 A | 11/1999 | Cho | |
| 5,999,297 A | 12/1999 | Penninckx | |
| 6,008,926 A | 12/1999 | Moodie et al. | |
| 6,052,498 A | 4/2000 | Paniccia | |
| 6,122,414 A | 9/2000 | Shimizu | |
| 6,147,366 A | 11/2000 | Drottar et al. | |
| 6,151,347 A | 11/2000 | Noel et al. | |
| 6,198,853 B1 | 3/2001 | Yamada | |
| 6,222,963 B1 | 4/2001 | Grand et al. | |
| 6,298,177 B1 | 10/2001 | House | |
| 6,377,596 B1 | 4/2002 | Tanaka et al. | |
| 6,393,169 B1 | 5/2002 | Paniccia et al. | |
| 6,434,289 B1 | 8/2002 | Paniccia et al. | |
| 6,459,712 B2 | 10/2002 | Tanaka et al. | |
| 6,600,842 B2 | 7/2003 | Yamada | |
| 6,614,821 B1 | 9/2003 | Jikutani et al. | |
| 6,757,091 B1 | 6/2004 | Nicolaescu et al. | |
| 6,778,751 B2 | 8/2004 | Tada et al. | |
| 6,801,676 B1 | 10/2004 | Liu | |
| 6,845,198 B2 | 1/2005 | Montgomery et al. | |
| 6,870,969 B2 | 3/2005 | Liu | |
| 6,925,101 B2 | 8/2005 | Matsumura | |
| 6,954,558 B2 | 10/2005 | Liu | |
| 6,983,004 B2 | 1/2006 | Jikutani et al. | |
| 7,006,717 B2 | 2/2006 | Liu et al. | |
| 7,035,487 B2 * | 4/2006 | Samara-Rubio et al. | 385/3 |
| 2001/0028755 A1 | 10/2001 | Akiyama | |
| 2001/0038655 A1 | 11/2001 | Tanaka et al. | |
| 2002/0051601 A1 | 5/2002 | Hung | |
| 2002/0054724 A1 | 5/2002 | Tada et al. | |
| 2002/0071621 A1 | 6/2002 | Yamada | |
| 2002/0089711 A1 | 7/2002 | Conzone et al. | |
| 2002/0093717 A1 | 7/2002 | Paniccia et al. | |
| 2002/0181828 A1 | 12/2002 | Irwin et al. | |
| 2002/0191886 A1 | 12/2002 | Castoldi et al. | |
| 2003/0002767 A1 | 1/2003 | Hanneman, Jr. | |
| 2003/0095736 A1 | 5/2003 | Kish, Jr. et al. | |
| 2003/0128729 A1 | 7/2003 | Matsumura | |
| 2003/0138179 A1 | 7/2003 | Akiyama et al. | |
| 2003/0198286 A1 | 10/2003 | Belotserkovsky | |
| 2004/0160658 A1 | 8/2004 | Liu | |
| 2004/0208454 A1 | 10/2004 | Montgomery et al. | |
| 2004/0213497 A1 | 10/2004 | Liu | |
| 2004/0228381 A1 | 11/2004 | Jikutani it al. | |
| 2004/0264828 A1 | 12/2004 | Liu | |
| 2005/0123260 A1 | 6/2005 | Liu et al. | |
| 2005/0175305 A1 | 8/2005 | Liu et al. | |
| 2005/0286851 A1 | 12/2005 | Liu et al. | |

FOREIGN PATENT DOCUMENTS

WO     WO 02/069004 A2     9/2002

OTHER PUBLICATIONS

Tang, C.K. et al., "Highly Efficient Optical Phase Modulator In SOI Waveguides," Electronic Letters, vol. 31, No. 6, (Mar. 16, 1995), pp. 451-452.

Zhao, C.Z. et al., "Silicon-On-Insulator Optical Intensity Modulator Based On Waveguide-Vanishing Effect," Electronic Letters, vol. 32, No. 18, (Aug. 29, 1996), pp. 1667-1668.

Cutolo, A. et al., "Silicon Electro-Optic Modulator Based On A Three Terminal Device Integrated In A Low-Loss Single-Mode SOI Waveguide," Journal of Lightwave Technology, vol. 15, No. 3, (Mar. 1997), pp. 505-518.

Dainesi, P. et al., "CMOS Compatible Fully Integrated Mach-Zehnder Interferometer In SOI Technology," IEEE Photonic Technology Letters, vol. 12, No. 6, (Jun. 2000), pp. 660-662.

Alferness, R.C. et al., "Velocity-Matching Techniques for Integrated Optic Traveling Wave Switch/Modulators," IEEE Journal of Quantum Electronics, vol. QE-20, No. 3, (Mar. 1984), pp. 301-309.

* cited by examiner

METHOD AND APPARATUS FOR PHASE SHIFITING AN OPTICAL BEAM IN AN OPTICAL DEVICE

BACKGROUND OF THE INVENTION

1. Field of the Invention

The present invention relates generally to optics and, more specifically, the present invention relates to modulating optical beams.

2. Background Information

The need for fast and efficient optical-based technologies is increasing as Internet data traffic growth rate is overtaking voice traffic pushing the need for optical communications. Transmission of multiple optical channels over the same fiber in the dense wavelength-division multiplexing (DWDM) systems and Gigabit (GB) Ethernet systems provide a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers, lasers and optical switches. Optical switches may be used to modulate optical beams. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally relies upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate (LiNbO$_3$).

Lithium niobate is a transparent material from ultraviolet to mid-infrared frequency range that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

The present invention is illustrated by way of example and not limitation in the accompanying figures.

DETAILED DESCRIPTION

Methods and apparatuses for high speed phase shifting an optical beam with an optical device are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

Figure 1A:
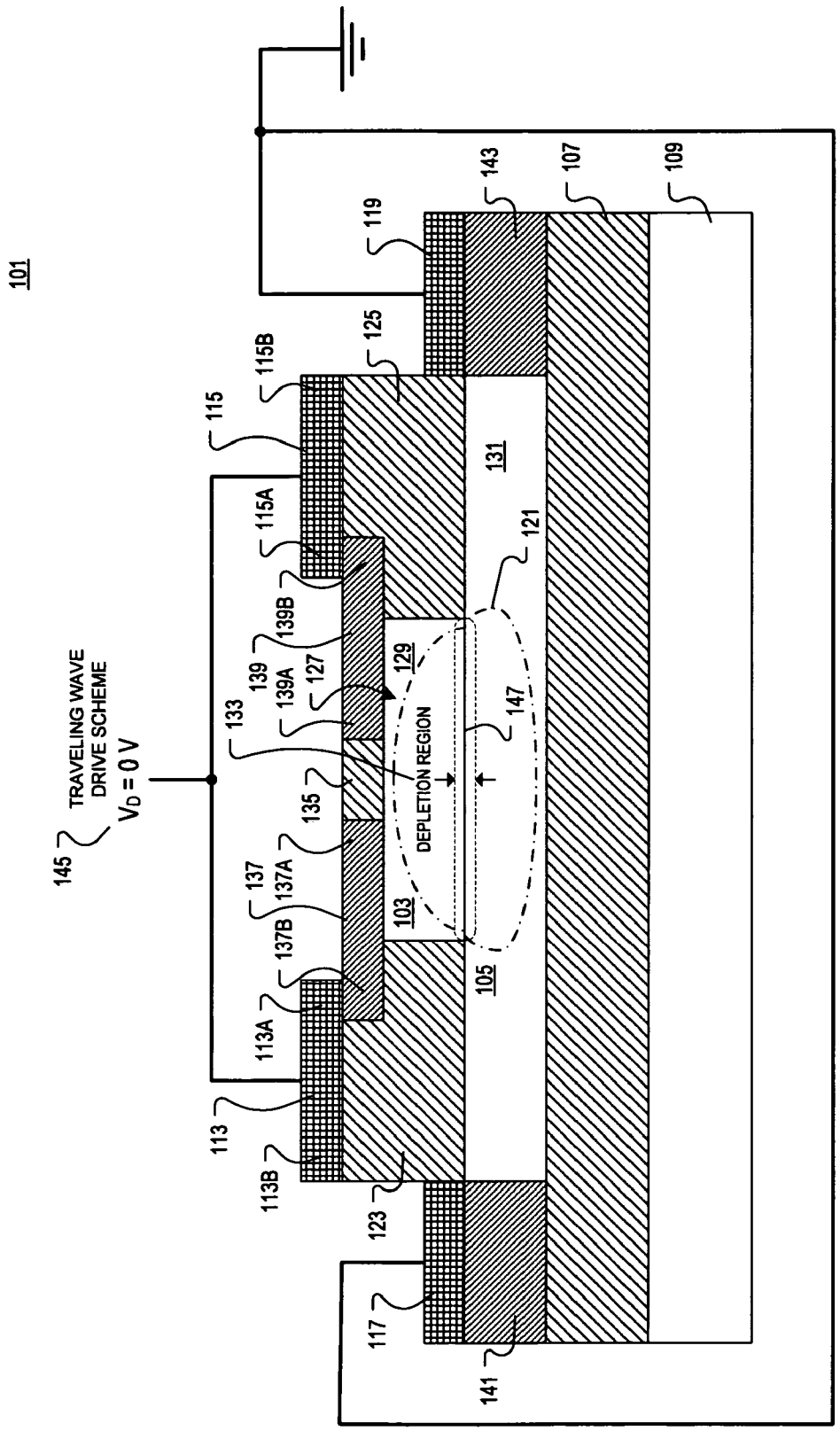
FIG. 1A is a cross-section illustration for one embodiment of an optical device including an optical waveguide with a depletion region at a pn junction interface with a drive in accordance with the teachings of the present invention.

To illustrate, FIG. 1A is a cross-section diagram illustrating generally an optical device 101 including an optical waveguide 127 with a depletion region 133 at a pn junction interface 147 with a substantially zero external drive voltage 145 in accordance with the teachings of the present invention. For one embodiment, there are substantially no free charge carriers in depletion region 133, while there are free charge carriers outside of depletion region 133. As shown in the illustrated example, optical device 101 includes an optical waveguide 127 including adjoining regions 103 and 105 of semiconductor material having opposite doping types. In one example, the semiconductor material includes silicon (Si). For example, region 103 may include n type silicon and region 105 may include p type silicon such that the free charge carriers in the n type silicon outside of depletion region 133 are electrons and the free charge carriers in the p type silicon outside of depletion region 133 are holes. In other examples, the semiconductor material may include other suitable types of semiconductor material such as for example germanium (Ge), Si/Ge, or the like.

For one embodiment, regions 103 and 105 have doping concentrations such that the pn junction interface 147 between regions 103 and 105 is reverse biased due to the built-in electrical field, even without an externally applied drive voltage 145 in accordance with the teachings of the present invention. In one example, region 103 is n type silicon having a doping concentration of approximately $1\times10^{17}$ cm$^{-3}$ and region 105 is p type silicon having a doping concentration of approximately $1\times10^{17}$ cm$^{-3}$. With these doping concentrations in regions 103 and 105, there is a depletion region 133 present at pn junction interface 147 between regions 103 and 105, even without an externally applied drive voltage 145 in accordance with the teachings of the present invention.

Continuing with the example illustrated in FIG. 1A, optical device 101 is included in a silicon-on-insulator (SOI) wafer, and therefore includes a buried oxide layer 107 disposed between another semiconductor layer 109 and the semiconductor material of regions 105. Optical device 101 further includes first and second buffers of insulating material 123 and 125 disposed along the optical waveguide 127. First and second higher doped regions 137 and 139 of semiconductor material are also disposed in optical device 101 outside an optical path of the optical waveguide 127. For one embodiment, first and second higher doped regions 137 and 139 include n+ doped poly silicon having doping concentrations that are higher than the doping concentration of n doped region 103, which is within the optical path of the optical waveguide 127. For another embodiment, first and second higher doped regions 137 and 139 include p+ doped poly silicon having doping concentrations that are higher than the doping concentration of p doped region 103, which is within the optical path of the optical waveguide 127. The example in FIG. 1A shows the mode of an optical beam 121 propagating along the optical path through optical waveguide 127.

As mentioned, FIG. 1A illustrates that first and second higher doped regions 137 and 139 are disposed outside the optical path of optical waveguide 121. With first and second higher doped regions 137 and 139 disposed outside the optical path of optical waveguide 121, optical loss is reduced. As shown in the illustrated example, first higher doped region 137 includes an inner portion 137A and an outer portion 137B. Similarly, second higher doped region 139 includes an inner portion 139A and an outer portion 139B. Inner portions 137A and 139A are adjoining and electrically coupled to region 103 of optical waveguide 127. Outer portion 137B is adjoining first buffer 123 and outer portion 139B is adjoining second buffer 125.

As shown in the example of FIG. 1A, optical device 101 also includes a first contact 113 and a second contact 115. As shown, first and second contacts 113 and 115 are also located outside the optical path of optical waveguide 127 with first buffer 123 disposed between first contact 113 and the optical path and second buffer 125 disposed between second contact 115 and the optical path. For one embodiment, first and second contacts 113 and 115 include metal with high electrical conductivity and low resistance. First contact 113 includes an inner portion 113A and an outer portion 113B. Second contact 115 includes an inner portion 115A and an outer portion 115B. Inner portion 113A of first contact 113 is adjoining and electrically coupled outer portion 137B of first higher doped region 137. Inner portion 115A of second contact 115 is adjoining and electrically coupled outer portion 139B of second higher doped region 139. Outer portion 113B of first contact 113 is adjoining first buffer 123 and outer portion of 115B is adjoining second buffer 125. For one embodiment, first and second contacts 113 and 115 are combined and connected with a metal electrode designed for high frequency traveling wave signal transmission in accordance with the teachings of the present invention.

Continuing with the example shown in FIG. 1A, optical device 101 also includes a third higher doped region 141 and a fourth higher doped region 143 of semiconductor material are also disposed in optical device 101 along the sides of region 105 outside the optical path of the optical waveguide 127. For one embodiment, third and fourth higher doped regions 141 and 143 include p+ doped poly silicon having doping concentrations that are higher than the doping concentration of region 105, which is within the optical path of the optical waveguide 127. As shown, third and fourth higher doped regions 141 and 143 are adjoining and electrically coupled to region 105 of optical waveguide 127. Optical device 101 also includes a third contact 117 and a fourth contact 119. Third contact 117 is adjoining and electrically coupled third higher doped region 141 and fourth contact 119 is adjoining and electrically coupled to fourth higher doped region 143.

For one embodiment, first and second contacts are coupled to receive an external drive voltage 145 and third and fourth contacts 141 and 143 are coupled to ground. Thus, the bias of the pn junction interface 147 between regions 103 and 105 is adjusted with the application of the external drive voltage 145 through higher doped regions 137, 139, 141 and 143 in accordance with the teachings of the present invention. The higher doping concentrations higher doped regions 137, 139, 141 and 143 help improve the electrical coupling of metal contacts 113, 115, 117 and 119 to semiconductor material regions 103 and 105 in accordance with the teachings of the present invention. This improved electrical coupling reduces the contact resistance between metal contacts 113, 115, 117 and 119 and semiconductor material regions 103 and 105, which reduces the resistor-capacitor (RC) time constant of optical device 101, which improves the electrical performance of optical device 101 in accordance with the teachings of the present invention. The reduced RC time constant of optical device 101 enables faster switching times and device speed for optical device 101 in accordance with the teachings of the present invention.

It is appreciated that first higher doped region 137 is used to bridge first contact 113 and region 103. Similarly, second higher doped region 139 is used to bridge second contact 115 and region 103. To reduce radio frequency (RF) attenuation, only a small part, or inner portion 113A, of first contact 113 overlaps with outer portion 137B first higher doped region 137. Similarly, only a small part, or inner portion 115A, of second contact 115 overlaps with (outer portion 139B) first higher doped region 139. In one example, inner portions 113A and 115A are substantially less than half the total respective sizes of first and second contacts 113 and 115 in accordance with the teachings of the present invention. The remaining portions of first and second contacts 113 and 115 that do not overlap with first and second higher doped regions 137 and 139 are adjoining first and second buffers 123 and 125 in accordance with the teachings of the present invention.

For one embodiment, a traveling wave drive scheme is employed to apply a signal via external drive voltage 145 to adjust the size or thickness of depletion region 133 at the pn junction interface 147 between regions 103 and 105 of optical waveguide 127 in accordance with the teachings of the present invention. In the example device shown in FIG. 1, both the optical wave and RF wave co-propagate along the waveguide. When the RF phase velocity matches the optical group velocity, the optical beam experiences phase shift responding to the applied electrical field. The device speed is therefore not limited by the RC time constant in accordance with the teachings of the present invention.

For one embodiment, the respective widths, heights, and relative positions to the higher doped regions of first and contacts 113, 115 as well as contacts 117 and 119 are designed to obtain the velocity matching. For example, RF phase velocity is generally determined by the device inductance and capacitance. By varying the metal contact geometry and semiconductor as well as dielectric layer thickness, the inductance and capacitance values can be changed, and in turn, the RF phase velocity can be matched with optical group velocity. This is called "real" phase velocity matching. In another example the phase velocities may be "artificially" matched by, for example, utilizing a phase reversed electrode design. In addition, doping distribution and metal electrode may be designed to obtain a small RF attenuation. For instance, less than 6 dB is needed for the benefit using traveling wave drive scheme in accordance with the teachings of the present invention.

For one embodiment, when there is no external drive voltage or when the external drive voltage is substantially zero, the depletion region 133 at the pn junction interface 147 between regions 103 and 105 of optical waveguide 127 is a result of the built-in electrical field caused by the doping concentrations of regions 103 and 105. However, when a non-zero external drive voltage, such as for example −3.5 Volts, is applied via external drive voltage 145, the reverse bias at the pn junction interface 147 between regions 103 and 105 of optical waveguide 127 is increased, which results in the corresponding depletion region 133 being substantially larger or thicker in accordance with the teachings of the present invention.

Figure 1B:
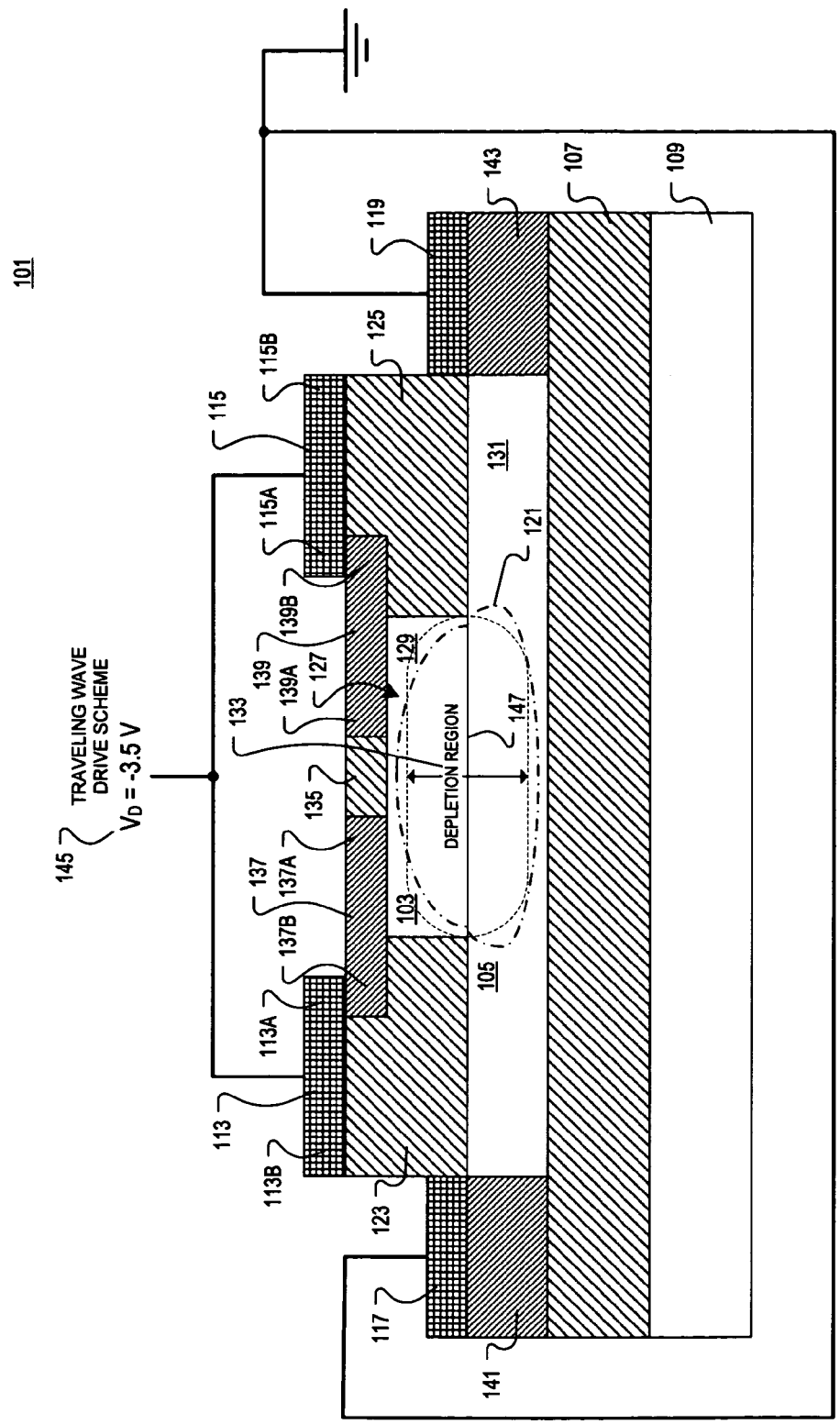
FIG. 1B is a cross-section illustration for one embodiment of an optical device including an optical waveguide with an increased depletion region at a pn junction interface in accordance with the teachings of the present invention.

To illustrate, FIG. 1B provides an illustration showing for example a non-zero external drive voltage 145 of −3.5 Volts being applied, which results in the increased reverse bias at the pn junction interface 147 between regions 103 and 105 of optical waveguide 127. As can be observed, the corresponding depletion region 133 is substantially larger or thicker with the external drive voltage 145 of −3.5 Volts being applied in accordance with the teachings of the present invention. As a result of the larger or thicker depletion region 133, a greater cross-sectional area of the mode of optical beam 121 propagating along the optical path through optical waveguide 127 propagates through a depletion region with substantially no free charge carriers, when compared to the smaller or thinner depletion region 133 illustrated in FIG. 1A with a substantially zero external drive voltage 145.

By modulating depletion region 133 at the pn junction interface 147 between regions 103 and 105 of optical waveguide 127 in response drive signal 145 as shown, the overall concentration of free charge carriers along the optical path of optical waveguide 127 through which the optical beam 121 is directed is modulated in response to the external drive voltage 145 by modulating the size of the depletion region 133 in accordance with the teachings of the present invention. As will be discussed, the phase of the optical beam 121 propagating along the optical path through optical waveguide 127 is therefore modulated in response to drive signal 145 in accordance with the teachings of the present invention.

Continuing with the illustrated example, first buffer 123 is disposed between first contact 113 and the optical path of optical beam 121. Second buffer 125 is disposed between second contact 115 and the optical path of optical beam 121. For one embodiment, the insulating material included in first and second buffers 123 and 125 are made of materials such as oxides having lower refractive indexes than the refractive index of the core of waveguide 127. As a result, first and second buffers 123 and 125 serve as cladding so as to help confine optical beam 121 to remain within optical waveguide 127. In the example illustrated in FIG. 1, buried insulating layer 107 also serves as cladding so as to help confine optical beam 121 to remain within waveguide 127. For one embodiment, first and second buffers 123 and 125 also serve as electrical isolators so as to electrically isolate the contacts coupled to optical waveguide 127 from the optical electric field guided from optical beam 121 in accordance with the teachings of the present invention.

The illustrated example also shows a buffer plug 135 of insulating material disposed between higher doped regions 137 and 139 so as to "push" the mode of optical beam 121 away from higher doped regions 137 and 139 so as to further reduce optical loss in optical beam 121 in accordance with the teachings of the present invention. Another benefit of including buffer plug 135 is to reduce the junction loss between waveguides with and without phase shifter in accordance with the teachings of the present invention. For one embodiment, first and second buffers of insulating material 123 and 125 as well as buffer plug 135 and buried oxide layer 107 all include an oxide material. Thus, buffer plug 135 is also made of a material having a lower refractive index than the refractive index of the core of waveguide 127. As a result, buffer plug 135 helps to direct the mode of optical beam 121 away from first and second metal contacts 113 and 115 as well as higher doped regions 137 and 139 in accordance with the teachings of the present invention. Locating first and second metal contacts 113 and 115 as well as higher doped regions 137 and 139 away from the mode optical beam 121, or outside the optical path of optical beam 121, reduces the optical loss due to first and second contacts 113 and 115 in accordance with the teachings of the present invention.

In operation, optical beam 121 is directed through optical waveguide 127 along an optical path through depletion region 133. A signal is applied to optical waveguide 127 through external drive voltage 145 to modulate or adjust the thickness of depletion region 133, which modulates the presence or absence of free charge carriers along the optical path through optical waveguide 127. Stated differently, the overall free charge carrier concentration along the optical path of optical waveguide 127 is modulated in response to the signal applied to optical waveguide 127 through external drive voltage 145. The free charge carriers present or absent along the optical path through which the optical beam 121 is directed through optical waveguide 127 may include for example electrons, holes or a combination thereof. The presence of free charge carriers may attenuate optical beam 121 when passing through. In particular, the free charge carriers along the optical path of optical waveguide 127 may attenuate optical beam 121 by converting some of the energy of optical beam 121 into free charge carrier energy. Accordingly, the absence or presence of free charge carriers in charge regions 133 in response to in response to external drive voltage 145 will modulate optical beam 121 in accordance with the teachings of the present invention.

In the illustrated example, the phase of optical beam 121 that passes through depletion region 133 is modulated in response to the signal applied through external drive voltage 145. For one embodiment, the phase of optical beam 121 passing through free charge carriers or the absence of free charge carriers in optical waveguide 127 is modulated due to the plasma optical effect. The plasma optical effect arises due to an interaction between the optical electric field vector and free charge carriers that may be present along the optical path of the optical beam 121 in optical waveguide 127. The electric field of the optical beam 121 polarizes the free charge carriers and this effectively perturbs the local dielectric constant of the medium. This in turn leads to a perturbation of the propagation velocity of the optical wave and hence the index of refraction for the light, since the index of refraction is simply the ratio of the speed of the light in vacuum to that in the medium. Therefore, the index of refraction in optical waveguide 127 of optical device 101 is modulated in response to the modulation of free charge carriers. The modulated index of refraction in the optical waveguide 127 of optical device 101 correspondingly modulates the phase of optical beam 121 propagating through optical waveguide 127 of optical device 101. In addition, the free charge carriers are accelerated by the field and lead to absorption of the optical field as optical energy is used up. Generally the refractive index perturbation is a complex number with the real part being that part which causes the velocity change and the imaginary part being related to the free charge carrier absorption. The amount of phase shift Φ is given by $$\Phi = (2\pi/\lambda)\Delta nL \quad \text{(Equation 1)}$$

with the optical wavelength λ, the refractive index change Δn and the interaction length L. In the case of the plasma optical effect in silicon, the refractive index change Δn due to the electron ($\Delta N_e$) and hole ($\Delta N_h$) concentration change is given by:

$$\Delta n = -\frac{e^2 \lambda^2}{8\pi^2 c^2 \varepsilon_0 n_0} \left( \frac{b_e (\Delta N_e)^{1.05}}{m_e^*} + \frac{b_h (\Delta N_h)^{0.8}}{m_h^*} \right) \quad \text{(Equation 2)}$$

where $n_o$ is the refractive index of intrinsic silicon, e is the electronic charge, c is the speed of light, $\varepsilon_0$ is the permittivity of free space, $m_e^*$ and $m_h^*$ are the electron and hole effective masses, respectively, $b_e$ and $b_h$ are fitting parameters. The optical absorption coefficient change Δα due to free charge carriers in silicon are given by $$\Delta \alpha = \frac{e^3 \lambda^2}{4\pi^2 c^3 \varepsilon_0 n_0} \left[ \frac{\Delta N_e}{m_e^{*2} \mu_e} + \frac{\Delta N_h}{m_h^{*2} \mu_e} \right] \quad \text{(Equation 3)}$$

where λ is the wavelength of light in free space, c is the velocity of light in a vacuum, $n_o$ is the refractive index of intrinsic silicon, $m_e^*$ is the effective mass of electrons, $m_h^*$ is the effective mass of holes, $\mu_e$ is the electron mobility and $\mu_h$ is the hole mobility.

Figure 2:
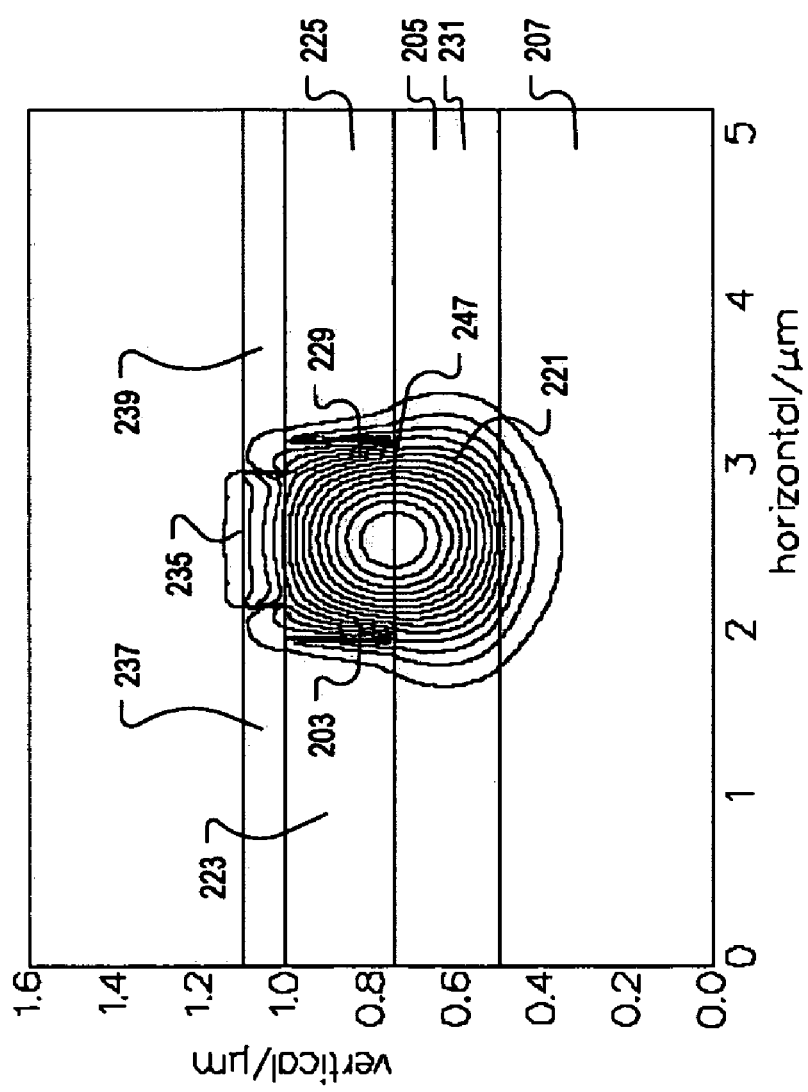
FIG. 2 is a diagram illustrating vectorial modeling of the transverse electric field (TE) mode of optical beam shown a single mode device for an embodiment of an optical waveguide including a depletion region at a pn junction in accordance with the teachings of the present invention.

As shown in the illustrated example, optical waveguide 127 is a rib waveguide including a rib region 129 and a slab region 131. FIG. 2 is a diagram that illustrates generally increased detail of an example by showing vectorial modeling of the transverse electric field (TE) mode of an optical beam 221 directed through an optical waveguide 227 in accordance with the teachings of the present invention. For one embodiment, optical waveguide 227 is substantially similar to, and may be used in place of, optical waveguide 127 illustrated in FIGS. 1A and 1B in accordance with the teachings of the present invention. In particular, FIG. 2 shows an optical device 201 including optical waveguide 227. Optical waveguide 227 is disposed in the regions 203 and 205 of silicon of an SOI wafer and includes a rib region 229 and a slab region 231 disposed proximate to a buried oxide layer 207 of the SOI wafer. For one embodiment, region 203 includes n type silicon and region 205 includes p type silicon. The rib region 229 is laterally disposed between a first buffer 223 and a second buffer 225. A buffer plug 235 is disposed on the "top" side of rib region 229, as illustrated in FIG. 2, opposite the buried oxide layer 207. First and second higher doped regions of poly silicon 237 and 239 are disposed in the optical device and are adjoining and electrically coupled to rib region 229 at the "upper corners."

As can be seen in the illustrated example, the intensity of the propagating optical mode of optical beam 221 is vanishingly small at the "upper corners" of rib region 229 as well as the "sides" of the slab region 231 of optical waveguide 227. As can also be observed, with the structure of first and second buffer regions 223 and 225, buffer plug 235 and buried oxide layer 207, the optical field or optical mode of optical beam 221 is substantially confined in towards the center or core of optical waveguide 227 near the pn junction interface 247 in accordance with the teachings of the present invention.

For one embodiment, optical beam 221 includes infrared or near infrared light. For example, for one embodiment optical beam 221 has a wavelength near approximately 1.3 μm or 1.55 μm. In the illustrated example, the optical path along which optical beam 221 is directed is along an axis that parallel to the axis of the optical waveguide 227 of optical device 201. The optical path and therefore optical beam 221 are shown to propagate along a direction going through, or coming in and out of, the page.

As can be observed along the vertical axis of the example illustrated in FIG. 2, the thickness of the epitaxial silicon of the SOI wafer, which includes regions 203 and 205 combined, is approximately 0.5 μm. For instance, region 203 has a thickness of approximately 0.25 μm and region 205 has a thickness of approximately 0.25 μm. As can be observed along the horizontal axis of the example illustrated in FIG. 2, the width of optical waveguide 207 or rib region 229 is approximately 1 μm. As shown in the depicted example, optical waveguide 227 is a single mode device in accordance with the teachings of the present invention.

Figure 3B:
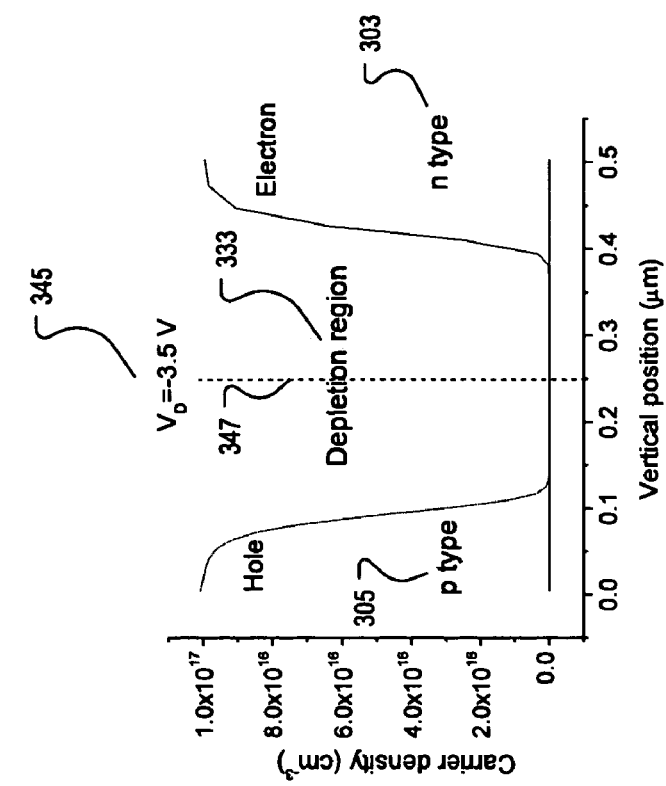
FIG. 3B is a diagram illustrating an increased depletion region at a pn junction with an applied drive voltage in accordance with the teachings of the present invention.
Figure 3A:
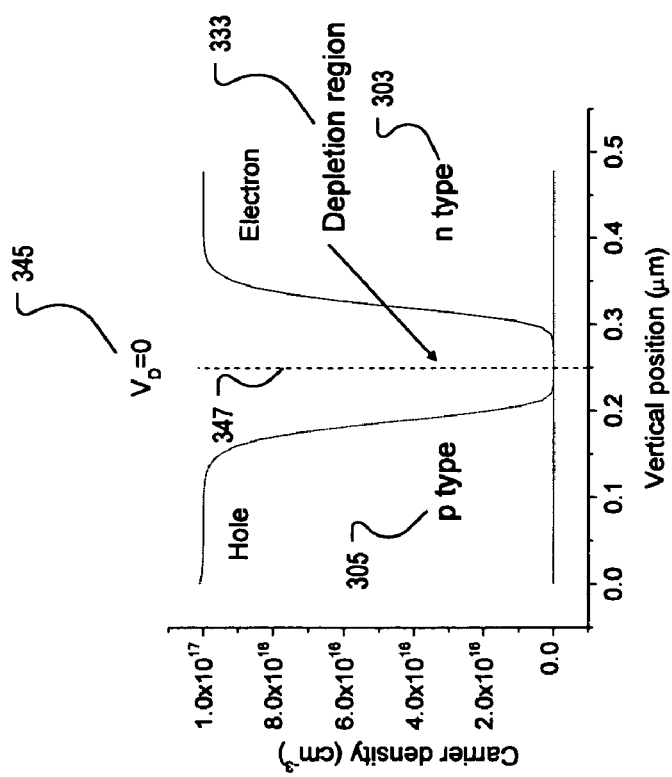
FIG. 3A is a diagram illustrating a depletion region at a pn junction without an applied drive voltage in accordance with the teachings of the present invention.

FIGS. 3A and 3B are diagrams comparing generally the free carrier distribution and/or depletion region at the pn junction interface for an embodiment of the present invention with and without an applied external drive voltage in accordance with the teachings of the present invention. The optical device illustrated may be any one of the optical devices discussed above with respect to FIGS. 1-2 in accordance with the teachings of the present invention. FIGS. 3A and 3B illustrate a pn junction interface 345 between a p type region 305 of silicon and an n type region 303 of silicon. As shown along the x-axis of FIG. 3A, the pn junction interface 345 is vertically positioned at 0.25 μm. As can be observed from the carrier distribution curves, with external drive voltage $V_D$ equal to 0 V, the carrier density of holes in the p type region 305 is zero at the pn junction interface 345 and is not the intrinsic doping concentration value of $1.0 \times 10^{17}$ cm$^{-3}$ within approximately 0.05 μm of pn junction interface 345. Similarly, with external drive voltage $V_D$ equal to 0 V, the carrier density of electrons in the n type region 303 is zero at the pn junction interface 345 and is not the intrinsic doping concentration value of $1.0 \times 10^{17}$ cm$^{-3}$ within approximately 0.05 μm of pn junction interface 345. Therefore, with a substantially zero external drive voltage $V_D$, the depletion region 333 in the optical device has a total thickness of approximately 0.1 μm at pn junction interface 345. As shown in the illustrated example, the depletion width is substantially equal or slightly smaller than the waveguide rib width.

In contrast, as shown along the x-axis of FIG. 3B, with external drive voltage $V_D$ equal to a non-zero value of for example −3.5 V, the carrier density of holes in the p type region 305 is zero at the pn junction interface 345 and is not the intrinsic doping concentration value of $1.0 \times 10^{17}$ cm$^{-3}$ within approximately 0.2 μm of pn junction interface 345, which is nearly to the edge of the optical waveguide. Similarly, with external drive voltage $V_D$ equal to −3.5 V, the carrier density of electrons in the n type region 303 is zero at the pn junction interface 345 and is not the doping concentration value of $1.0 \times 10^{17}$ cm$^{-3}$ within approximately 0.2 μm of pn junction interface 345, which is nearly to the other edge of the optical waveguide. Therefore, the depletion region 333 in the optical device has a total thickness of approximately 0.4 μm centered at pn junction interface 345 with a substantially non-zero external drive voltage $V_D$ of for example −3.5 V.

As mentioned, the depletion region 333 extends from the pn junction interface 345 to substantially near the waveguide edge of the optical waveguide for one embodiment with the external drive voltage applied as shown in FIG. 3B. Accordingly, nearly all of the optical mode of an optical beam directed through the optical waveguide is directed through depletion region 333 when the external drive voltage as shown in FIG. 3B is applied. In contrast, when substantially no external drive voltage is applied, substantially less of the optical beam directed through the optical waveguide is directed through depletion region 333 in accordance with the teachings of the present invention, as illustrated in FIG. 3A. Thus, the amount of phase shift realized in the optical beam directed through the optical beam is changed in response to the application of either a zero or non-zero external drive voltage as illustrated in FIGS. 3A and 3B.

Figure 4:
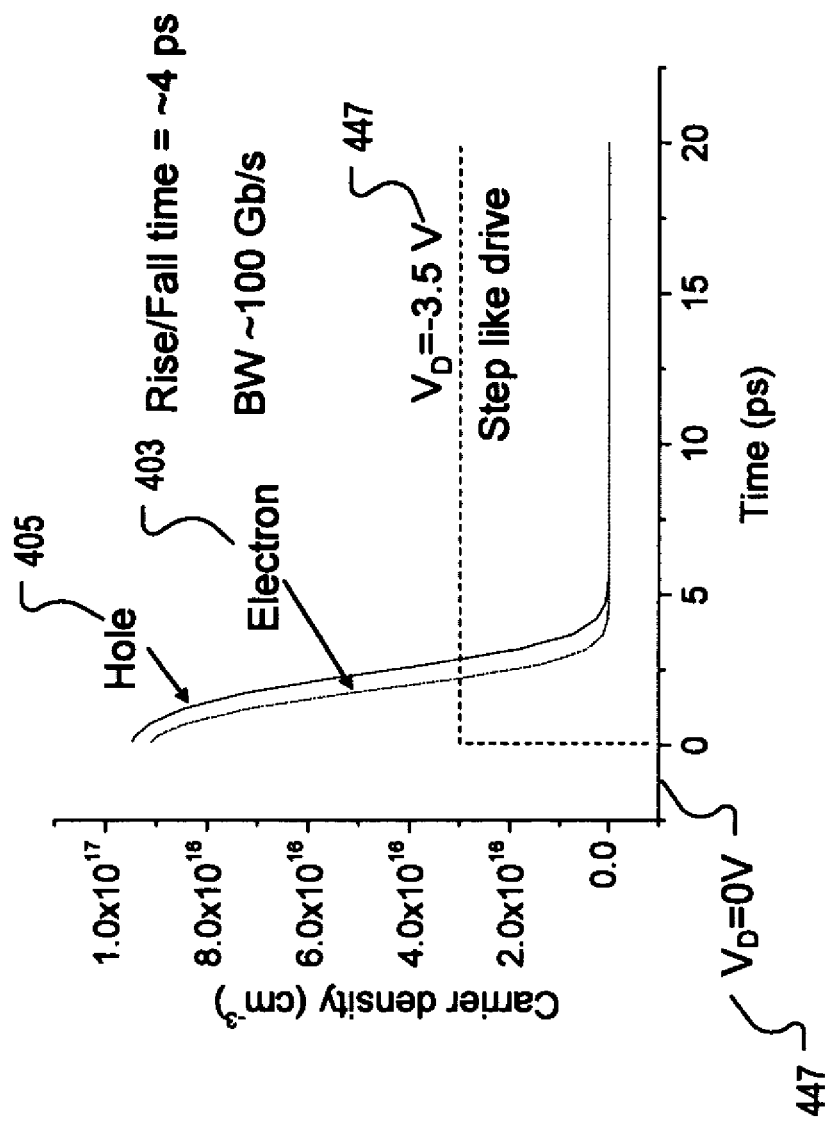
FIG. 4 is a diagram illustrating the transient response of free carrier concentration with respect to a step-like applied drive in an optical waveguide for an embodiment of an optical device in accordance with the teachings of the present invention.

FIG. 4 is a diagram illustrating generally the transient response of free carrier concentration with respect to a step-like applied external drive voltage in an optical waveguide for an embodiment of an optical device in accordance with the teachings of the present invention. The optical device illustrated may be any one of the optical devices discussed above with respect to FIGS. 1-3 in accordance with the teachings of the present invention. As optical phase modulation depends on the free carrier density change, the speed of the optical device can be estimated from the rise and fall times of the carrier concentrations in the optical waveguide. In the diagram depicted in FIG. 4, the external drive voltage $V_D$ is equal to approximately zero prior to time=0 ps. Prior to time=0 ps, the electron and hole carrier densities 403 and 405 are both approximately equal to $1.0 \times 10^{17}$ cm$^{-3}$. FIG. 4 shows that at time=0 ps, the external drive voltage is changed from 0 V to −3.5 V. As can be observed, the corresponding rise/fall time of the carrier densities 403 and 405 to zero occurs within approximately 4 ps to increase the thickness of the depletion region as discussed above. The rise/fall time equal to approximately 4 ps represents an intrinsic speed of ~100 Gb/s in the optical device. Thus, using a traveling wave driving scheme, an optical device runs at a speed of 40-100 Gb/s in accordance with the teachings of the present invention. The ultimate device speed could be affected by other factors such as for example the electric circuitry driving the external drive voltage in accordance with the teachings of the present invention.

It is appreciated of course that the specific carrier densities, doping concentrations, voltages, dimensions, times, speeds, etc., described throughout this description are provided for explanation purposes and that other values may be utilized within the spirit and scope of the teachings of the present invention. For instance, in another example, the external drive voltage may for example be lower such as −1.5 V instead of −3.5. In such an example, the length of the optical device could be increased to provide a longer interaction length to provide in comparable phase shift in accordance with the teachings of the present invention. With a lower external drive voltage, it is appreciated that the electric circuitry driving the optical device may be simplified. In an example utilizing silicon, the phase modulation efficiency due to the carrier density change induced refractive index variation in the silicon is high with index variations of greater than 70%. In this example, a π/2 phase shift may be realized with an interaction length of ~5 mm at an external drive voltage of −1.75 V in accordance with the teachings of the present invention.

Figure 5:
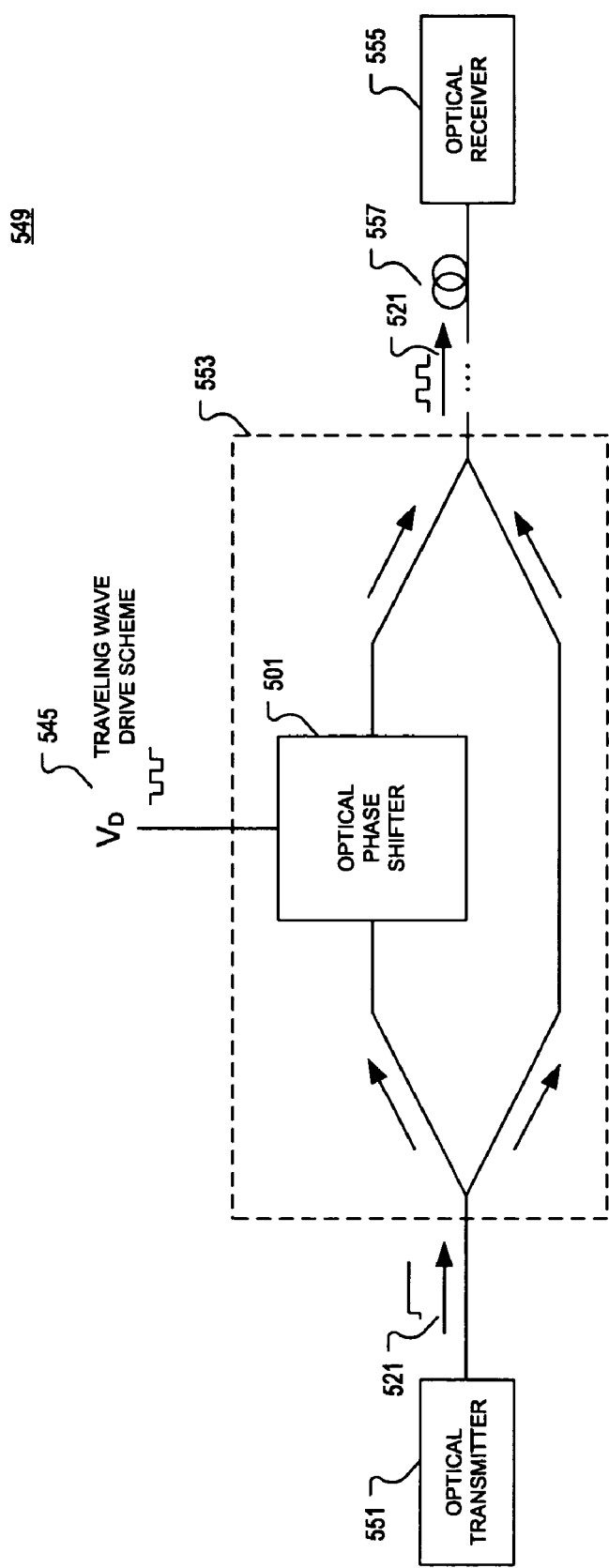
FIG. 5 is a diagram illustrating a system including an optical device having an optical phase shifter to modulate an optical beam for an embodiment in accordance with the teachings of the present invention.

FIG. 5 illustrates generally a block diagram of one embodiment of a system including an optical transmitter and an optical receiver with an optical device including an optical phase shifter according to embodiments of the present invention. In particular, FIG. 5 shows an optical system 549 including an optical transmitter 551 and an optical receiver 555. For one embodiment, optical system 549 also includes an optical device 553 optically coupled between optical transmitter 551 and optical receiver 555. As shown in FIG. 5, optical transmitter 551 transmits an optical beam 521 that is continuous wave and received by optical device 551. For one embodiment, optical device 553 may include for example a device such as any of the optical devices described above in connection with FIGS. 1-4 to phase shift optical beam 521 in response to an external drive voltage $V_D$ 545. In the illustrated example, an optical fiber 557 is optically coupled between optical device 553 and optical receiver 555. For one embodiment, an output optical waveguide included in optical device 553 includes tapers to improve the optical coupling to optical fiber 557 to efficiently couple the light of optical beam 521 between optical device 553 and optical fiber 557.

For one embodiment, a semiconductor-based optical amplitude modulator is provided in a fully integrated solution on a single integrated circuit chip realized with optical device 553 in accordance with the teachings of the present invention. In particular, FIG. 5 illustrates generally optical phase shifter 501 included in at least one of the two arms optically coupled between cascaded Y-branch couplers of a Mach-Zehnder Interferometer (MZI) configuration disposed in semiconductor material. In operation, optical beam 521 is directed into an input of optical device 553, which is directed into the MZI configuration as shown. Optical beam 521 is split such that a first portion of the optical beam 521 is directed through one of the arms of the MZI configuration and a second portion of optical beam 521 is directed through the other one of the arms of the MZI configuration. As shown in the depicted embodiment, one of the arms of the MZI configuration includes optical phase shifter 501, which adjusts a relative phase difference between the first and second portions of optical beam 521 in response to the external drive voltage $V_D$ 545.

For one embodiment, the first and second portions of optical beam 521 are then merged in the semiconductor substrate such that optical beam 521 is modulated at the output of the MZI configuration as a result of constructive or destructive interference. In the illustrated example, only one of the arms of the MZI configuration includes an optical phase shifter 501. In another example, both of the arms of the MZI configuration may include an optical phase shifter 501 in accordance with the teachings of the present invention. For instance, for one embodiment, optical phase shifters inserted into both arms of the MZI configuration provides a greater than 12 dB extinction ratio at the output using push-pull driving scheme in accordance with the teachings of the present invention.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   an optical waveguide having adjoining first and second regions disposed in semiconductor material, the first and second regions having opposite doping types;
   a first buffer disposed along the optical waveguide;
   a first higher doped region of semiconductor material outside an optical path of the optical waveguide, an inner portion of the first higher doped region adjoining and coupled to the first region of the optical waveguide, an outer portion of the first higher doped region adjoining the first buffer, the first higher doped region having a higher doping concentration than a doping concentration within the optical path of the optical waveguide;
   a first contact having an inner portion adjoining and coupled to the first higher doped region, the first contact having an outer portion adjoining the first buffer; and
   a depletion region overlapped by the optical path of the optical waveguide at an interface between the first and second regions of the waveguide, the first and second regions of the waveguide having respective doping concentrations such that the depletion region is present without a drive voltage externally applied to the optical waveguide.

2. The apparatus of claim 1 wherein a size of the depletion region at the interface between the first and second regions of the optical waveguide is increased in response to the drive voltage externally applied to the optical waveguide.

3. The apparatus of claim 1 wherein the inner portion of the first contact is smaller than the outer portion of the first contact.

4. The apparatus of claim 1 further comprising a second buffer disposed along the optical waveguide.

5. The apparatus of claim 4 further comprising a second higher doped region of semiconductor material, an inner portion of the second higher doped region adjoining and coupled to the first region of the optical waveguide, an outer portion of the second higher doped region adjoining the second buffer, the second higher doped region having a higher doping concentration than the doping concentration within the optical path of the optical waveguide.

6. The apparatus of claim 5 further comprising a second contact having an inner portion adjoining and coupled to the second doped region, the second contact having an outer portion adjoining the second buffer.

7. An apparatus, comprising:
   first and second regions of semiconductor material having first and second conductivity types and first and second doping concentrations, respectively;
   an optical waveguide defined in the semiconductor material having an optical path defined along an interface between the first and second regions;
   a first higher doped region of semiconductor material outside the optical path of the optical waveguide and coupled to the first region, the first higher doped region having a higher doping concentration than the first doping concentration;
   a first contact coupled to the first higher doped region outside the optical path of the optical waveguide; and
   a depletion region at the interface between the first and second regions resulting from first and second doping concentrations of the first and second regions, respectively, the depletion region present with a substantially zero external drive voltage applied to the first and second regions.

8. The apparatus of claim 7 wherein a size of the depletion region is increased in response to a non-zero external drive voltage applied to the first and second regions.

9. The apparatus of claim 7 further comprising a first buffer disposed along the optical waveguide.

10. The apparatus of claim 9 wherein the first higher doped region of semiconductor material includes an inner portion that is adjoining and coupled to the first region, the first higher doped region of semiconductor material having an outer portion that is adjoining the first buffer.

11. The apparatus of claim 10 wherein the first contact includes an inner portion adjoining and coupled to the first higher doped region, the first contact having an outer portion adjoining the first buffer.

12. The apparatus of claim 7 wherein the external drive voltage is coupled to be received by the first contact.

13. A system, comprising:
   an optical transmitter to generate an optical beam;
   an optical receiver optically coupled to receive the optical beam;
   an optical device optically coupled between the optical transmitter and the optical receiver, the optical device including an optical phase shifter optically coupled to an optical fiber to modulate a phase of the optical beam, the optical phase shifter including:
      first and second regions of semiconductor material having first and second conductivity types and first and second doping concentrations, respectively;
      an optical waveguide defined in the semiconductor material through which the optical beam is to be directed, the optical waveguide having an optical path defined along an interface between the first and second regions;
      a first higher doped region of semiconductor material outside the optical path of the optical waveguide and coupled to the first region, the first higher doped region having a higher doping concentration than the first doping concentration;

a first contact coupled to the first higher doped region outside the optical path of the optical waveguide; and a depletion region at the interface between the first and second regions resulting from first and second doping concentrations of the first and second regions, respectively, the depletion region present with a substantially zero external drive voltage applied to the first and second regions.

14. The system of claim 13 wherein a size of the depletion region is adjusted in response to a non-zero external drive voltage applied to the first and second regions.

15. The system of claim 13 further comprising a first buffer disposed along the optical waveguide.

16. The system of claim 15 wherein the first higher doped region of semiconductor material includes an inner portion that is adjoining and coupled to the first region, the first higher doped region of semiconductor material having an outer portion that is adjoining the first buffer, wherein the first contact includes an inner portion adjoining and coupled to the first higher doped region, the first contact having an outer portion adjoining the first buffer.

17. The system of claim 16 further comprising
a second buffer disposed along the optical waveguide;
a second higher doped region of semiconductor material, an inner portion of the second higher doped region adjoining and coupled to the first region of the optical waveguide, an outer portion of the second higher doped region adjoining the second buffer, the second higher doped region having a higher doping concentration than the doping concentration within the optical path of the optical waveguide; and
a second contact having an inner portion adjoining and coupled to the second doped region, the second contact having an outer portion adjoining the second buffer.

18. The system of claim 17 further comprising
third and fourth higher doped regions of semiconductor material adjoining and coupled to the second region outside the optical path of the optical waveguide; and
third and fourth contacts coupled to the third and fourth higher doped regions, respectively.

19. The system of claim 13 wherein the external drive voltage is coupled to be applied to the first and second regions through the first, second, third and fourth contacts.

* * * * *